US009319864B2

(12) United States Patent
Salqvist (10) Patent No.: US 9,319,864 B2
(45) Date of Patent: Apr. 19, 2016

(54) METHOD AND SYSTEM FOR ROAMING OF A MOBILE COMMUNICATIONS UNIT (71) Applicant: GLOBETOUCH AB, Stockholm (SE)

(72) Inventor: Fredrik Salqvist, Osterskar (SE)

(73) Assignee: GLOBETOUCH AB, Stockholm (SE)

( * ) Notice: Subject to any disclaimer, the term of this patent is extended or adjusted under 35 U.S.C. 154(b) by 0 days.

(21) Appl. No.: 14/653,291

(22) PCT Filed: Dec. 3, 2013

(86) PCT No.: PCT/SE2013/051436
§ 371 (c)(1),
(2) Date: Jun. 18, 2015

(87) PCT Pub. No.: WO2014/098721
PCT Pub. Date: Jun. 26, 2014

(65) Prior Publication Data
US 2015/0358806 A1 Dec. 10, 2015

(30) Foreign Application Priority Data
Dec. 21, 2012 (SE) .................................... 12515011

(51) Int. Cl.
*H04W 8/02* (2009.01)
*H04M 15/00* (2006.01)
*H04W 8/12* (2009.01)
*H04W 4/24* (2009.01)
*H04W 8/18* (2009.01)

(52) U.S. Cl.
CPC ............ *H04W 8/02* (2013.01); *H04M 15/8038* (2013.01); *H04W 4/24* (2013.01); *H04W 8/12* (2013.01); *H04W 8/18* (2013.01); *H04M 2215/34* (2013.01)

(58) Field of Classification Search
None
See application file for complete search history.

(56) References Cited

U.S. PATENT DOCUMENTS

| 6,738,622 | B1 | 5/2004 | Stadelmann et al. | |
|---|---|---|---|---|
| 2004/0052224 | A1* | 3/2004 | Arvidsson | H04W 8/12 370/329 |
| 2005/0192007 | A1 | 9/2005 | Kumar et al. | |
| 2006/0276226 | A1* | 12/2006 | Jiang | H04W 8/183 455/558 |

(Continued)

FOREIGN PATENT DOCUMENTS

| EP | 2144458 | 1/2010 |
|---|---|---|
| WO | 0176188 | 10/2001 |

(Continued)

OTHER PUBLICATIONS

International Search Report dated Apr. 15, 2014, corresponding to PCT/SE2013/051436.

*Primary Examiner* — Kimberly A Williams
(74) *Attorney, Agent, or Firm* — Young & Thompson (57) ABSTRACT A method when roaming by a mobile communication device including a SIM card identifying itself using an IMSI roams between a home network and one or several visited networks, which networks are interconnected by a PSTN. The method a) stores on the SIM card a first IMSI associated with a first collaborating network; b) initiates a location update procedure using the first IMSI; c) triggered by the location update procedure and based on the first IMSI, causes an STP (Signal Transfer Point) of the first collaborating network to send a location update message to an ITP (Internet Transfer Point); and d) causes the first ITP to forward the message to an STP of the home network via a wide area network and not using the PSTN.

15 Claims, 4 Drawing Sheets (56) References Cited

U.S. PATENT DOCUMENTS

| | | | |
|---|---|---|---|
| 2007/0254648 A1* | 11/2007 | Zhang | H04L 29/06027 455/433 |
| 2008/0244148 A1* | 10/2008 | Nix, Jr. | H04L 41/0856 710/313 |
| 2009/0215449 A1* | 8/2009 | Avner | H04W 8/06 455/433 |
| 2010/0128685 A1 | 5/2010 | Jiang | |
| 2010/0136967 A1 | 6/2010 | Du et al. | |
| 2011/0007726 A1* | 1/2011 | Xie | H04W 8/12 370/338 |
| 2011/0039518 A1 | 2/2011 | Maria | |
| 2011/0122820 A1 | 5/2011 | Bergqvist | |
| 2012/0282891 A1 | 11/2012 | Mohammed et al. | |
| 2012/0282924 A1* | 11/2012 | Tagg | H04W 8/04 455/432.1 |
| 2013/0029637 A1* | 1/2013 | Hillier | H04W 8/26 455/411 |
| 2013/0295924 A1* | 11/2013 | Sutherns | H04W 8/06 455/433 |
| 2014/0051423 A1* | 2/2014 | Marsden | H04W 4/001 455/419 |
| 2015/0319603 A1* | 11/2015 | Faller | H04W 8/00 455/432.1 |
| 2015/0350868 A1* | 12/2015 | Zehavi | H04M 1/2535 455/432.1 |
| 2015/0350869 A1* | 12/2015 | Karshenas Najafabadi | H04W 8/02 455/432.1 |

FOREIGN PATENT DOCUMENTS

| | | |
|---|---|---|
| WO | 2005081962 | 9/2005 |
| WO | 2007132233 | 11/2007 |
| WO | 2008057472 | 5/2008 |
| WO | 2008103446 | 8/2008 |

* cited by examiner

METHOD AND SYSTEM FOR ROAMING OF A MOBILE COMMUNICATIONS UNIT

TECHNICAL FIELD

The present invention relates to a method and a system for roaming of a mobile communications unit between mobile communication networks in different countries.

BACKGROUND

Presently, it is common for mobile operators to have national mobile communication networks, such as networks for mobile data and/or voice communication, for example GSM, GPRS, 3G, LTE, etc. When a mobile communication unit is brought outside of the coverage area of a certain network and into the coverage area of the network of another operator, conventional roaming gives rise to problems with high and unpredictable costs for data and/or voice communication.

These problems are especially common when it comes to mobile data traffic, where costs during roaming with variable tariffs can amount to more than 1000 times higher per data unit as compared to mobile data traffic in the home network. Many times there are no efficient ways of keeping track of the costs during a stay abroad or the like. As a consequence, a user risks unpleasant surprises regarding mobile data costs when returning from a stay within the coverage area of the network of a foreign operator.

EP2144458 describes a method using an interface means to provide a SIM card with information regarding available networks for data traffic as well as connection costs for said networks.

WO2007132233 describes a method for remotely configuring a mobile communications device, and for registering and authenticating users of such a device. Configuration data is received and converted by the device, and a configuration database is updated using the data. In one example, different Subscriber Identity Module (SIM) cards with different International Mobile Subscriber Identities (IMSI) can be tied to the same user account for roaming.

WO2005081962 describes a method for keeping costs down for voice communication when roaming, by establishing a corresponding Voice over IP (VoIP) call when requesting a voice call from a mobile unit over a cellular network.

WO2008103446 describes a method in which the IMSI of a SIM is associated with a local telephone number (MSISDN) when roaming, in order to enjoy local tariffs.

WO2001076188 describes a method in which a care of address is used with a mobile device when performing IP-based communication.

The international patent application PCT/SE2011/050886, which has not been published on the filing date of the present application, describes a method according to which a local IMSI is automatically distributed to a SIM card in a mobile device roaming into a visited country.

A drawback of this method is that it exposes the home operator to the risk of misconfiguration in partner networks. Such misconfiguration will lead to malfunction of the roaming function. Namely, the method relies upon that a location update request message from a roaming device is correctly routed from the local roaming partner, via a local PSTN operator and a home PSTN operator, to the home network. This in turn involves processing of the IMSI, for instance using a routine involving translating the IMSI into a so called Global Title number format, which can be understood correctly by the PSTN operators. In the case of a network with many roaming partners, different IMSI number ranges for different purposes, customer agreements and so forth, the risk for misconfiguration of the IMSI number conversion at one or several of the local roaming partners is non-negligible.

SUMMARY

The present invention solves the above described problems of high roaming costs in an automatic way which requires minimum network and mobile device modification. It also solves the problem of creating a large, possibly complicated roaming network in which a method according to the said international application is used while keeping the exposure to misconfiguration by external partners to a minimum.

Thus, the invention relates to a method for use when a mobile communication device roams between a mobile communication home network in a home country and one or several mobile communication networks in one or several visited countries, which home network and networks in said visited countries are interconnected by a PSTN (Public Switched Telephone Network) operated by one or several PSTN operators, via which PSTN telephone signaling can be performed during roaming using a telephony signaling protocol, which mobile communication device comprises a Subscriber Identity Module (SIM) card identifying itself to each network using an International Mobile Subscriber Identity (IMSI), which method is characterized in that the method comprises the steps of a) storing on the SIM card a first visited country IMSI which is associated with a first collaborating mobile communication network in the first visited country, and using it for network identification of the SIM card; b) when the mobile device is located within the coverage area of the first collaborating network, causing the mobile device to initiate a location update procedure using the first visited country IMSI; c) triggered by the said location update procedure and based on the first visited country IMSI used therein, causing an STP (Signal Transfer Point) of the first collaborating network to send a location update message to a first ITP (Internet Transfer Point); and d) causing the first ITP to forward the location update message to an STP of the home network via a wide area network and not using the PSTN.

Further, the present invention relates to a system for providing mobile communication signaling connection to a mobile communication device within the coverage area of a home network in a home country and one or several mobile communication networks in one or several visited countries, between which networks the mobile device can roam and which networks are interconnected by a PSTN (Public Switched Telephone Network) operated by one or several PSTN operators, via which PSTN telephone signaling can be performed during roaming using a telephony signaling protocol, which mobile communication device comprises a Subscriber Identity Module (SIM) card arranged to identify itself to a network using an International Mobile Subscriber Identity (IMSI), which system is characterized in that the system comprises a first ITP (Internet Transfer Point), arranged to receive a first location update message comprising a first visited country IMSI, associated with a first collaborating network, from an STP (Signal Transfer Point) of the first collaborating network, and in that the first ITP is further arranged to forward the location update message to an STP of the home network via a wide area network and not using the PSTN.

BRIEF DESCRIPTION OF THE DRAWINGS

In the following, the invention will be described in detail, with reference to the appended drawings, where.

All figures share reference numerals and annotations.

DETAILED DESCRIPTION

Figure 1:
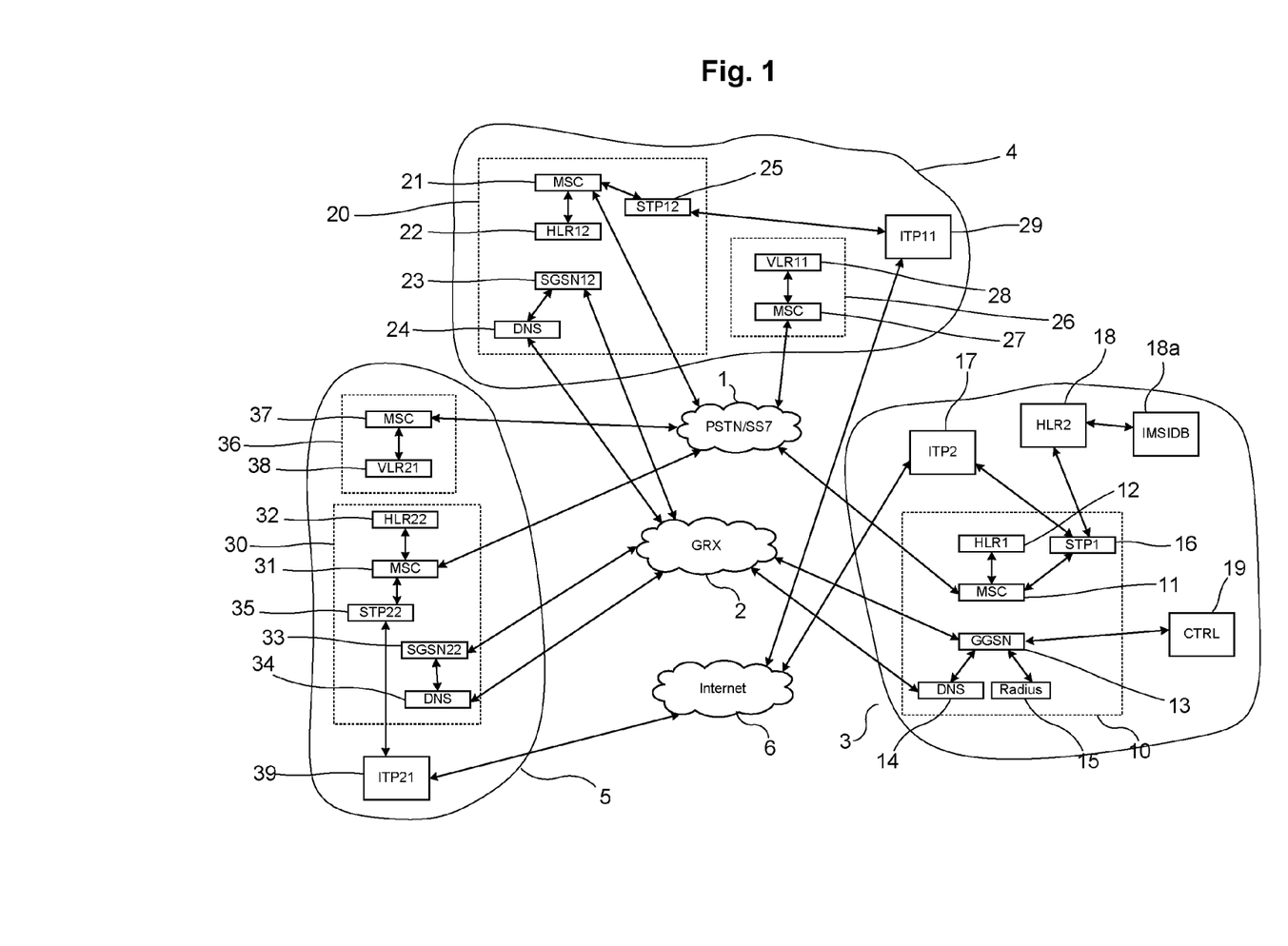
FIG. 1 is a simplified overview diagram of a system according to the present invention for use in a method according to the present invention.

FIG. 1 illustrates a mobile communications network 10 which is a home network to a certain mobile communications device (not shown in FIG. 1). In other words, the mobile device is a subscriber to the home network 10. The home network 10 comprises a Mobile Switching Centre (MSC) 11, a Home Location Register (HLR) (HLR1) 12, a Gateway GPRS Support Node (GGSN) 13, a Dynamic Name Server (DNS) function 14 which is conventional as such and a Remote Authentication Dial In User Service (RADIUS) server 15 which also is conventional as such. The home network 10 also comprises a Signal Transfer Point (STP) (STP1) 16, which is conventional as such and is arranged to transfer messages using the SS7 signaling protocol between the MSC 11 and entities external to the network 10.

The home network 10 can, however, be of any general type which is able to provide access to mobile communication services to the class of mobile devices which use Subscriber Identity Module (SIM) cards for network identification. In FIG. 1, the home network 10 is a GSM/GPRS network, but it is realized that other types of mobile communication networks in which a mobile communication device is identified using a SIM card are also possible to use with the present invention, such as a 3G and LTE network. The same is true regarding the below described foreign networks 20, 26, 30, 36. Correspondingly, the ITP:s (Internet Transfer Point) 17, 29, 39 are described (below) in the context of a GSM/GPRS system. However, when the invention is applied in a 3G or LTE network, the corresponding functionality as described can be arranged in corresponding appliances.

The home network 10 is operable within a home country 3. The terms "home network" and "home country" are used simply to indicate a geographical location for the network 10, and does not imply a certain nationality of the mobile device user, an operator or such.

A mobile device can thus, when located in the home country 3, connect to the home network 10 and hence obtain access to mobile communications services. The mobile device can be of any suitable type, such as a mobile phone or a mobile data modem, and comprises a SIM card which is used to identify the mobile device to the network using an IMSI code.

Furthermore, the mobile device is capable of roaming to a first visited network 26 and a second visited network 36, both being similar to the home network 10 and to both of which the mobile device identifies itself using an IMSI code via its SIM card. The first visited network 26 is operable in a first visited country 4, which is different from the home country 3. Similarly, the second visited network 36 is operable in a second visited country 5, different from both the home country 3 and the first visited country 4. The first visited network 26 comprises an MSC 27 and a VLR (VLR11) 28. The second visited network 36 comprises an MSC 37 and a VLR (VLR21) 38.

In the first visited country 4, a first collaborating network 20 is also operable. Like the home network 10, the first collaborating network 20 comprises an MSC 21, a HLR (HLR12) 22, a DNS 24 and an STP (STP12) 25. The first collaborating network also comprises an SGSN (SGSN12) 23. As will become clear in the following, the operator of the first collaborating network 20 has beforehand entered into an agreement with the operator of the home network 10 concerning the provision of mobile communication services.

In a similar way, in the second visited country a second collaborating network 30 is also operable, comprising an MSC 31, a HLR (HLR22) 32 a DNS 34 and an STP (STP22) 35. The second collaborating network 30 also comprises an SGSN (SGSN22) 33. There is a similar agreement as to the provision of mobile communication services between the operator of the second collaborating network 30 and the operator of the home network 10. These agreements may also be entered into by a mutual agreement with an operator of the distributed network as described herein.

In practice, in each country, there may be several visited networks 26, 36 and several collaborating networks 20, 30 in the sense of the present invention. Furthermore, in any country a visited network 26, 36 may be the same as a collaborating network 20, 30.

A conventional PSTN 1 is set up for PSTN telephone signaling during roaming. Signaling takes place using a telephony signaling protocol, such as the SS7 protocol or any other suitable protocol, such as the SS7 extension SIGTRAN (SIGnaling TRANsport). PSTN 1 interconnects MSC:s 11, 21, 27, 31, 37. Data traffic is routed via a GPRX Roaming Exchange (GRX) 2, interconnecting the GGSN 13 and DNS 14 with SGSN:s 23, 33 and DNS:s 24, 34.

The respective STP of both the home network 10 (STP1) and the collaborating networks 20, 30 (STP12, STP22) are arranged to communicate with a respective ITP (ITP2 17, ITP11 29, ITP21 39, respectively). These ITP:s are not part of the respective network 10, 20, 30, but are comprised in a distributed network according to the invention for conveying signaling traffic when the mobile device roams between networks 10, 20, 30. In this context, an "ITP" is a digital signaling gateway which is arranged to connect a mobile telephone network STP to a digital wide area network such as the Internet, and to route signaling traffic from such STP to other Internet connected access points.

Each ITP is preferably arranged as a software function in a standalone server, and has its own SPC (Signaling Point Code), is arranged geographically close to its respective STP, preferably at least in the same country 3, 4, 5, and they are interconnected for communication via a wide area network such as the Internet 6. The said distributed network also comprises a HLR (HLR2) 18, a control unit (CTRL2) 19, arranged to keep track of all mobile devices roaming using the distributed network, including handling of IMSI ranges for different countries (see below), and a IMSI database (IMSIDB2) 18a.

Figure 2:
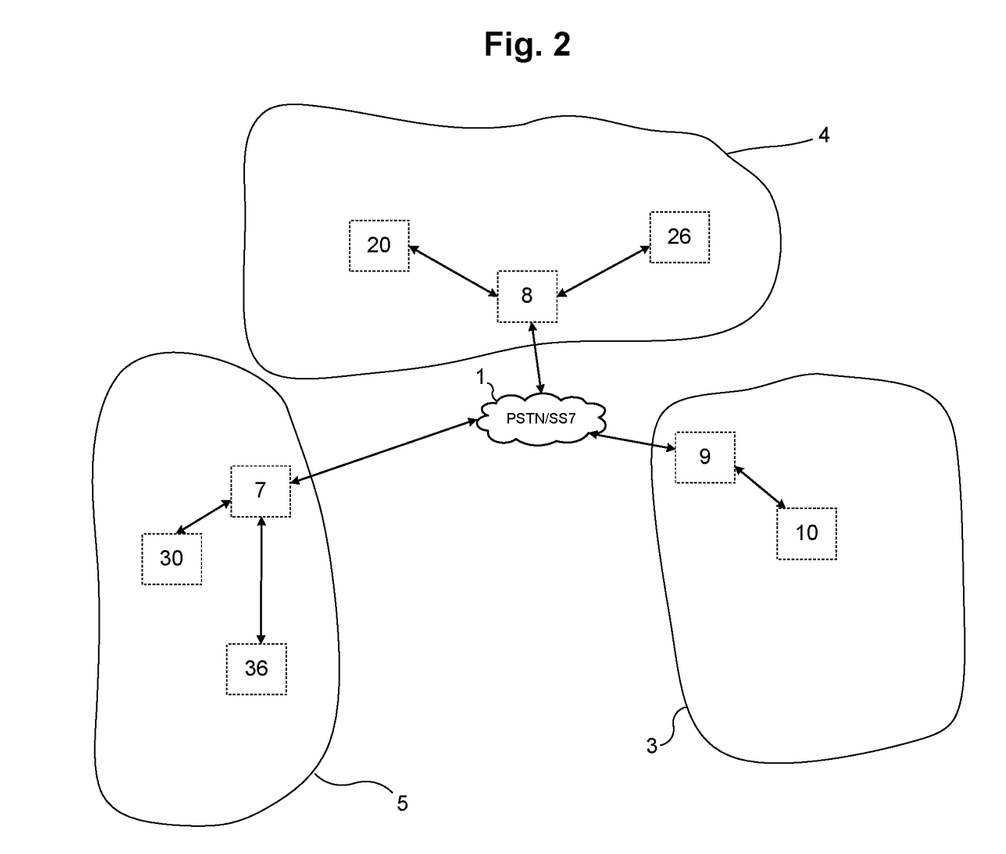
FIG. 2 is a simplified overview diagram similar to the one shown in FIG. 1, but only illustrating a prior art PSTN (Public Switched Telephone Network)

FIG. 2 illustrates how the PSTN 1 works. In each country 3, 4, 5, a respective PSTN operator 7, 8, 9 is arranged, interconnected by the PSTN 1 for signaling over the SS7 protocol. Each PSTN operator 7, 8, 9 is then connected to the respective mobile telephone operators 10, 20, 26, 30, 36 in each respective country 3, 4, 5.

Conventionally, when a mobile phone with home network 10 roams to, for instance, network 20, there will be SS7 signaling messages between the VLR of network 20 and HLR1 12 in order to set up the mobile device for roaming voice and data access to network 20. In order for such SS7 messages to be routed to the correct recipient, the IMSI of the mobile device is commonly converted, such as using the so called Global Title convention. A numerical identifier in the form of a Global Title will be understood correctly by both SS7 message routing PSTN operators 8 and 9. For instance, such number conversion may involve stripping the IMSI of a number of higher-order digits, and then adding the correct country and operator codes according to the Global Title.

Such conversion is prone to errors, since the conversion routine must be configured manually at each visited operator 20, 26, 30, 36.

In order to have local presence in other countries 4, 5 than the home country 3, a Mobile Virtual Network Operator (MVNO) operating in such visited countries 4, 5 must have its own IMSI series, comprising IMSI numbers which are local to each respective visited country 4, 5, and a roaming mobile subscriber to the MVNO must use such local IMSI. A general method for achieving this is described in the above referred to international patent application PCT/SE2011/050886, and is also described below.

In order to keep control when a subscriber mobile device roams, it is desirable to route signaling traffic back to the home network 10, via the local roaming partner 20 or 30. Conventionally, this then involves translating the local IMSI into a correct Global Title, so that SS7 messages can be correctly routed to the home network 10. In this case, each roaming partner needs to add configuration to translate the respective local IMSI range used by the MVNO in each respective visited country 4, 5 into a Global Title. A configuration error in a visited country 4, 5 may result in that a MVNO subscriber does not receive a connection.

The situation is further complicated when the MVNO wishes to collaborate with the home network 10 of a domestic operator, using the mobile provisioning of the home network 10 while keeping the control of the used IMSI ranges, billing, etc., in a way which is external to the home network 10. In this case, the signaling must be routed further by the home network, to for instance HLR2 18.

The present invention solves this problem by instead of using signaling routing via the international PSTN network 1, routing signaling messages over the Internet. This way, no IMSI translation is necessary, why the above described configuration errors no longer constitute a threat. Furthermore, using a method according to the present invention, an MVNO can gain local presence in a range of visited countries 4, 5 by only having to arrange one ITP 29, 39 in each respective visited country 4, 5, and one ITP 17 in the home country 3. ITP:s 29, 39 in the visited countries can be made quite simple, keeping most of the logic in the home country 3 ITP 17, and costs can therefore be kept low.

Figure 3:
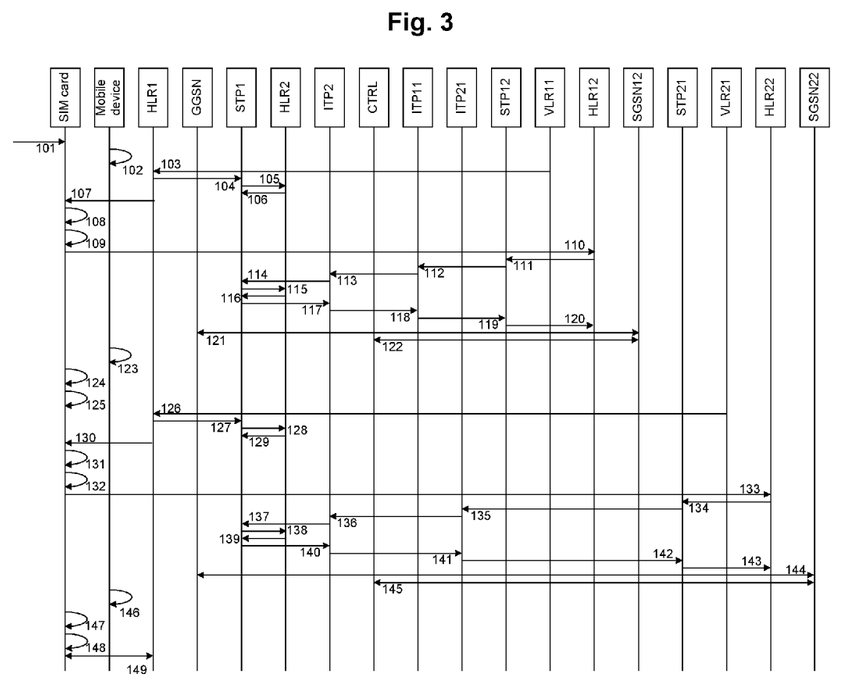
FIG. 3 is a flow chart of a method according to the present invention.

FIG. 3 illustrates, top down, the individual method steps of a method according to the present invention when the above described mobile communication device roams between the home network 10 in the home country 3 and visited networks 26, 36 in visited countries 4, 5.

In a first step 101, a home IMSI, associated with HLR1, is stored on the SIM card and used for network identification of the SIM card when the mobile device is within the coverage area of the home network 10 and thus provided access to mobile communication services by the home network 10. This step 101 can for example be taken in connection to the provision of the SIM card to the user of the mobile device, when setting up the subscription to the home network 10.

It is preferred that the said home IMSI is comprised in a predetermined range of IMSI codes domestic to country 3 that, in an initial step, the operator of network 10 and the operator of the distributed network have agreed upon, which IMSI codes are used by subscribers to the distributed network, and used for identification of SIM cards of such subscribers when located in country 3.

In step 102, the mobile device roams from the home network 10 into the coverage area of the first visited network 26 in the first visited country 4. In other words, the mobile device is brought from the coverage area of the home network 10 to a position in the first visited country 4 within the coverage area of the first visited network 26 in which there is not sufficient network coverage of the home network 10.

This roaming event will, in a step 103, trigger the VLR11 28 of the first visited network 20 to send, over PSTN 1, a conventional location update message to the home network 10, which message is intercepted by the HLR1 12 of the home network 10. The location update message includes information about what visited network the VLR11 28 is a part of, and thus indicates that the mobile device has moved from the coverage area of the home network 10 to the coverage area of the first visited network 26.

In steps 104, 105, the HLR1 12 forwards the location update information, via STP1 16, to HLR2 18. As described above, HLR2 18 is a part of the distributed network, and not part of network 10. Since the home IMSI is comprised in the predetermined range of domestic IMSI codes, HLR1 12 can lookup the IMSI contained in the location update, recognize it as the IMSI of a subscriber of the distributed network and based upon this IMSI information forward the location update message to HLR2 18.

HLR2 18 responds, in step 106, by sending another signaling message, to STP1 16, instructing the home network 10 to send, in a step 107, an instruction message over the air to the mobile device to change, from the home IMSI to a first visited country IMSI, the IMSI used for network identification of the SIM card.

In order to keep track of the predetermined range of domestic IMSI codes, an IMSI database IMSIDB 18a is connected to HLR2 18. This database also comprises a range of visited country IMSI codes, and associations between domestic IMSI codes and corresponding presently used visited IMSI codes for all subscribers to the distributed network which are currently roaming.

The IMSI change instruction message can, for instance, be sent from HLR1 12 as an SMS which is received by the SIM card. It is preferred that the provision of the first visited country IMSI to the mobile device is fully automatic and does not involve any specific action on the part of the user of the mobile device.

The first visited country IMSI is selected by the HLR2 18 from a list of available IMSI codes for the first visited country 4, see below. Furthermore, the first visited country IMSI is associated with the HLR12 22 of the first collaborating network 20.

In a step 108, carried out in response to the said IMSI change instruction message, the mobile device stores the received first visited country IMSI on the SIM card and uses it for network identification of the SIM card. In addition thereto, the mobile device saves the home IMSI originally used for network identification for later use.

Then, in a step 109, the mobile device performs a device network refresh. This is a locally performed action essentially equivalent to switching the mobile device, or the network connection, off and then on again. In practice the network refresh may be in the form of a SIMOTA refresh or, preferably, a SIMOTA reset. This will cause the mobile device to initiate a location update procedure 110 by sending a location update request message to HLR12 22, comprising the first visited country IMSI. According to the invention, the mobile device is caused to send such a message when located within the coverage area of the first collaboration network 20 in the first visited country 4. It is realized that this may be achieved in other ways than by performing a network refresh, such as by manually switching the mobile phone on from a switched off state.

That the "mobile device" receives the message from the HLR1 12 in step 107, updates the IMSI in step 108 and performs the device network refresh in step 109 is to be interpreted so that any functional software and/or hardware part of the mobile device is responsible for conducting these and other such tasks. According to a preferred embodiment, which is illustrated in FIG. 3, it is the SIM card which, being a part of the mobile device when installed therein, conducts the above tasks. The corresponding is true regarding steps 124, 125, 131, 132, 147 and 148, below.

After the device network refresh, the mobile device will be connected to the HLR12 22 of the first collaborating network 20, since the SIM card identifies itself using the first visited country IMSI, being associated with the HLR12 22. In other words, after the device network refresh, the mobile device wakes up in the role of a local mobile subscriber to the first collaborating network 20. As a consequence, the connection to the first visited network 26 will only be temporary, fulfilling the purpose of identifying in the home network 10 and HLR2 18 the roaming action of the mobile device to the first visited country 4. Note that in the case where the first visited 26 and the first collaborating 20 networks are actually the same, the first visited country IMSI will be local to the first visited network 26, and apart from this the invention is analogously applied.

According to the invention, triggered by said location update procedure initiated by the mobile device, and based upon the first visited country IMSI, which is associated with the first collaborating network 20 and is comprised in a location update message received, the STP12 25 of the first collaborating network 20 sends a location update message to the ITP11 29. This takes place in a step 112, after the HLR12 22 has sent the location update information to the STP12 25 in a step 111.

It is preferred that the first collaborating network 20 is arranged to send signaling messages, such as location update messages, either via STP12 25 to the ITP11 29 or to the PSTN 1, depending on the contents of the first visited country IMSI. Hence, the first collaborating network 20 is arranged to investigate the number contents of the IMSI, and, based upon previously stored associations between certain IMSI codes or other means, decide whether a certain signaling message is to be sent via STP12 25 to ITP11 29 or to PSTN 1.

The ITP11 29, in turn, forwards the location update message to the STP1 16 of the home network 10, using the Internet 6 and without using the PSTN 1.

As is illustrated in FIGS. 1 and 3, it is preferred that the distributed network comprises one ITP in country 3 as well as an ITP in country 4. Hence, the ITP11 29 is preferably located in the first visited country 4, and the forwarding of the location update takes place over the Internet 6 and via the home country ITP2 17 to the home network 10 STP1 16, in steps 113, 114. The STP1 16 in turn forwards the location update information to HLR1 12 in step 115.

Hence, it is preferred that a server comprising the HLR2 18 is connected to, but arranged externally to, the home network 10, which home network 10 forwards the location update message to the HLR2 18 based upon the IMSI contained in the location update message.

It is preferred that all signaling traffic between various HLR:s, STP:s and ITP:s uses the SS7 signaling protocol or extensions thereof, such as the SIGTRAN protocol.

Two-way signaling then continues via ITP:s 17, 29 and STP:s 16, 25, over the Internet 6 instead of the PSTN 1, from HLR12 22 to HLR2 18 via steps 111-115, and also in the opposite direction via steps 116-120 as seen in FIG. 3.

Hence, after step 115, a signaling message is sent by the STP1 16, addressed to the mobile device, and comprising the first visited country IMSI. The message is sent to the ITP2 17, which uses the first visited country IMSI to identify the ITP11 29 and then forwards the message to the ITP11 29, without using the PSTN 1, whereupon the IPT11 29 forwards the message to the STP12 25 of the first visited network 20, when so is needed for distribution to the MSC 11, HLR1 12 and/or the mobile device.

Hence, the ITP devices 29, 39 arranged in visited countries 4, 5 can be made very simple, basically only forwarding signaling traffic to ITP2 17. The ITP device 17 in the home country 3 can also be made relatively simple, but must however be associated with a database comprising information associating different visited country IMSI series with different visited country ITP devices 29, 39, and routing functionality for routing signaling messages to the correct ITP device 29, 39 depending on the addressed mobile device IMSI.

According to a preferred embodiment, the signaling in steps 111-120 is in the form of conventional SS7 or SIGTRAN messages, which are relayed over the Internet 6 rather than the PSTN 1. This way, existing SS7 and/or SIGTRAN equipment can be used in both networks 10 and 20, without any modifications other than routing signaling traffic relating to IMSI codes in the list of available IMSI codes for the first visited country 4 via ITP:s 17, 29 rather than via the conventional PSTN 1. At the same time, no IMSI number conversion is necessary, as described above. In fact, it is preferred that the first visited country IMSI is used as is, without modification.

Once contact has been established between HLR12 22 and MSC 11 via ITP2 17 and ITP1 29, it is preferred that all signaling traffic is routed this way moving forward.

Hence, using the present invention it is possible to reduce the risk of misconfiguration while still using a conventional SS7 protocol and not having to build a separate SS7 network.

It is preferred that the mobile device has previously stored an APN (Access Point Name) identifying GGSN 13 in the home network 10. When the mobile device requires Internet access, it attempts to initiate a data connection using the said APN. DNS and RADIUS functions are provided by DNS 14, 24 and RADIUS 15, in a way which is conventional as such apart from the signaling taking place via ITP:s 17, 29.

This signaling also takes place via ITP:s 17, 29 and STP:s 16, 25 as described above, and results, in step 121, in the setting up of an Internet data connection to the mobile device via the GGSN 13 and SGSN12 23 of the first collaborating network 20. In the exemplifying case of a GPRS system, the data traffic is routed via GRX 2 or alternatively an Internet tunnel. The existing DNS 14, 24 and RADIUS 15 functionality of networks 10, 20 can be used in the normal way.

It is specifically preferred that the Internet data (non-signaling) traffic is not routed via ITP:s 17, 29, since using GRX 2 and the existing infrastructure of networks 10, 20 results in low costs while still being able to provide subscribers to the distributed network an expected service level.

This latter is achieved by the distributed network comprising a control device CTRL 19, arranged to, in a step 122, monitor data communications for keeping track of current costs etc. It is preferred that the data communications of the mobile device terminate at the home network 10 and that it is the GGSN 13 of the home network 10 that provides the final Internet connection to the mobile device. One preferred possibility is to allow the first collaborating network 20 to use its own GGSN (not shown in FIG. 1) as a proxy router for data traffic between the network 20 and the GGSN 13, since this will allow the collaborating network 20 operator to also monitor data traffic. The control device CTRL 19 is connected to GGSN 13, for instance via a VPN (Virtual Private Network), to monitor and control the Internet connection.

According to one important aspect of the current invention, the mobile device is not provisioned with voice functionality when roaming to collaborating networks 20, 30, but only to signaling itself and data services, such as an Internet connection. The reason for this is that the signaling over the Internet 6 instead of the conventional PSTN 1 will not easily work with voice traffic, but will, for data only type mobile subscriptions work better than according to the prior art.

In this case, it is preferred that all of the visited country IMSI codes described herein, such as all IMSI codes used by the mobile device using a system according to the present invention except possibly the home IMSI, are associated with a setting in the respective HLR 12, 22, 32 with which the IMSI in question is associated making available data communication but not voice communication when roaming.

Furthermore, it is in this case preferred that the data communication to and from the mobile device when being served by a collaborating network 20, 30 is in the form of Internet access.

In a step 123, the mobile device roams further, now from the coverage area of the first collaborating network 20 to the coverage area of the second visited network 36 in the second visited country 5.

The mobile device is arranged to by itself detect such roaming activity and take appropriate action. In FIG. 3 it is the SIM card which itself detects the roaming event and acts. Thus, as a consequence of the roaming event, the mobile device is arranged to, in a step 124, change the IMSI used for network identification of the SIM card back to the home IMSI, which was previously saved in step 108.

Thereafter, in a step 125, the mobile device again performs a device network refresh. This device network refresh command will, in a step 126, again result in a location update message being sent, now from the VLR21 38 of the second visited network 36 to the home network 10.

In steps 127 and 128, the HLR1 12 again forwards the location update information, via STP1 16, to HLR2 18, based on the IMSI contained in the location update. In the response 129 from HLR2 18, there is an instruction to the home network 10 to send, in a step 130, an instruction message over the air to the mobile device to change, from the home IMSI to a second visited country IMSI, the IMSI used for network identification of the SIM card.

Analogously to the first visited country IMSI, the second visited country IMSI is selected by the HLR2 18 from a list of available IMSI codes for the second visited country 5, see below.

As an alternative to steps 124, 125 and 126, the HLR1 12 may be equipped with means for detecting the roaming of the mobile device, which is at the time associated with the HLR12 22 of the first collaborating network 20, to the second visited network 36, for example via a message from the second visited network 36 or from the first collaborating network 20. Then, the method will directly proceed to step 127.

The reception of the instruction message from the HLR1 12 will, in a step 131 and similarly to step 108 above, result in the mobile device storing the second visited country IMSI on the SIM card and using it for network identification of the SIM card, while in addition thereto again saving the home IMSI for later use.

Then, similarly to step 109 above, in a step 132, the mobile device will perform a device network refresh.

In a step 133, the mobile device will then connect to the HLR22 32 of the second collaborating network 30 as a local subscriber. Then, signaling steps 134-143 will be performed over the Internet 6 instead of via PSTN 1, in a way which is analog to steps 111-120 as described above.

Then, in a step 144, data traffic resulting from use of the mobile device with its SIM card, and identified using the second visited country IMSI, is routed between the second collaborating network 30 and the home network 10, between the SGSN22 33 and the GGSN 13 using GRX 2. Monitoring again takes place using CTRL 19 in step 145.

What is said about the relationship between the first visited network 26, the first collaborating network 20 and the home network 10 is also generally applicable to the corresponding relationship between the second visited network 36, the second collaborating network 30 and the home network 10.

In order to avoid unnecessary location update messages, if the mobile device looses contact with the currently used collaborating network without having traveled to another country, it preferably does not change its IMSI back to the home IMSI. When the network connection is eventually again available while still located in the same country, the connection to the current collaborating network will still be valid.

If and when, however, the mobile device subsequently roams into the coverage areas of further respective mobile communication networks in another country than the current, for example back to the first visited network 20 in the first visited country 4, a corresponding routine will be followed as the one described in connection to steps 123-145, in which the mobile device reinstitutes the home IMSI for network identification, whereupon the currently visited network sends out a location update message to the HLR1 12, which in turn instructs the mobile device over the air to update its IMSI used for network identification to an IMSI which is specific to the currently visited country and an available collaborating network in that country. During all such roaming activities, the mobile device will thus always operate using a local IMSI in the country in which it is currently located, while saving the home IMSI for future use.

If there is no available collaborating network in a country into which the mobile device is roaming, it is preferred that communication services, at least data traffic, become unavailable for the mobile device while in that country.

When, in a step 146, the mobile device eventually roams back to the coverage area of the home network 10 in the home country 3, the mobile device as a reaction thereto, in a step 147, changes its IMSI used for network identification of the SIM card back to the home IMSI. Then, in a step 148, it performs a device network refresh. Steps 147 and 148 are thus similar to steps 124 and 125. Thereupon, the mobile device will again, in a step 149, connect to the HLR1 12 of the home network 10 as a local subscriber.

Using such a system and method, it is possible for the operator of the home network 10 to guarantee that the communication of a mobile user during roaming will always be using a local identity. As a consequence, relatively low costs can be charged for mobile communication, even when roaming. Still, the operator of the distributed network maintains the control over the signaling and data traffic for its subscribers.

When roaming to visited networks from the home network or from another visited network, the change of IMSI to a new, local IMSI will be automatic and virtually immediate since the mobile device itself triggers the IMSI update sequence by reinstituting the original home IMSI upon roaming. Only a minimum of downtime, mainly to allow time for the device network refresh to become effective, will interrupt current communications. The present inventors have discovered that signaling via STP and ITP boxes is sufficiently fast and reliable for the purposes of data services.

By reverting back to the home IMSI, roaming chains are avoided. That is, if the home IMSI was not reinstituted and the device network refresh not performed by the mobile device, the collaborating network from which the mobile device was roaming to a visited network in another country would, since it considers the mobile device a local one, impart its normal roaming behavior, resulting in normal roaming costs etc.

Furthermore, since the home IMSI is always saved, the IMSI can be restored automatically and immediately when the mobile device returns back to the home network 10.

According to one preferred embodiment, at least one of the first, second or subsequent visited country IMSI codes are selected from a respective plurality of IMSI codes, associated with or comprised in the HLR2 18 and associated with the respective visited country where the respective visited country IMSI is used. Such a plurality of IMSI codes preferably contains less individual IMSI codes than the total number of users being served by the HLR1 12 and which are the subject of the present method. In other words, all users being subscribers to the home network 10 and who are served by the HLR1 12 will share a set of available visited country IMSI codes for each of the available visited countries, which set is smaller than the number of such users. Each IMSI in each such plurality is preferably unique to the respective collaborating network to which the IMSI in question is local.

According to a preferred embodiment, the SIM card installed in the mobile device is provided with a software SIM card application, arranged to monitor in which country and possibly also in which network's coverage area the mobile device is currently located. Such monitoring is preferably carried out by reading the communication between the mobile phone and the network or networks to which the mobile device is currently connected or can connect. Preferably, the country codes present in available networks at the current location of the mobile device are read, and a change of such country codes from one country to another is interpreted as a roaming event of the mobile device. In other words, it is only upon an actual detected change of the current country that steps 124 and 147 are performed as described above.

Further in accordance with this embodiment, the said software application is arranged to perform the above described updating changes of the IMSI used for network identification and arranged to perform the above described device network refresh events. It is furthermore preferred that it is the software application which saves the home IMSI while in a visited network.

Using such a SIM card software application, a user of an existing mobile device can obtain access to more cost-efficient communications while roaming merely by replacing his or her existing SIM card for a new SIM card having the above described SIM card software application preinstalled. Alternatively, the SIM card software application may even be downloaded into an existing SIM card using the mobile network or otherwise, making the method even simpler for the user.

According to a preferred embodiment, the roaming functionality of the present invention is completely self-contained within the SIM card, rendering the installation and operation in a mobile device safe and simple.

Figure 4:
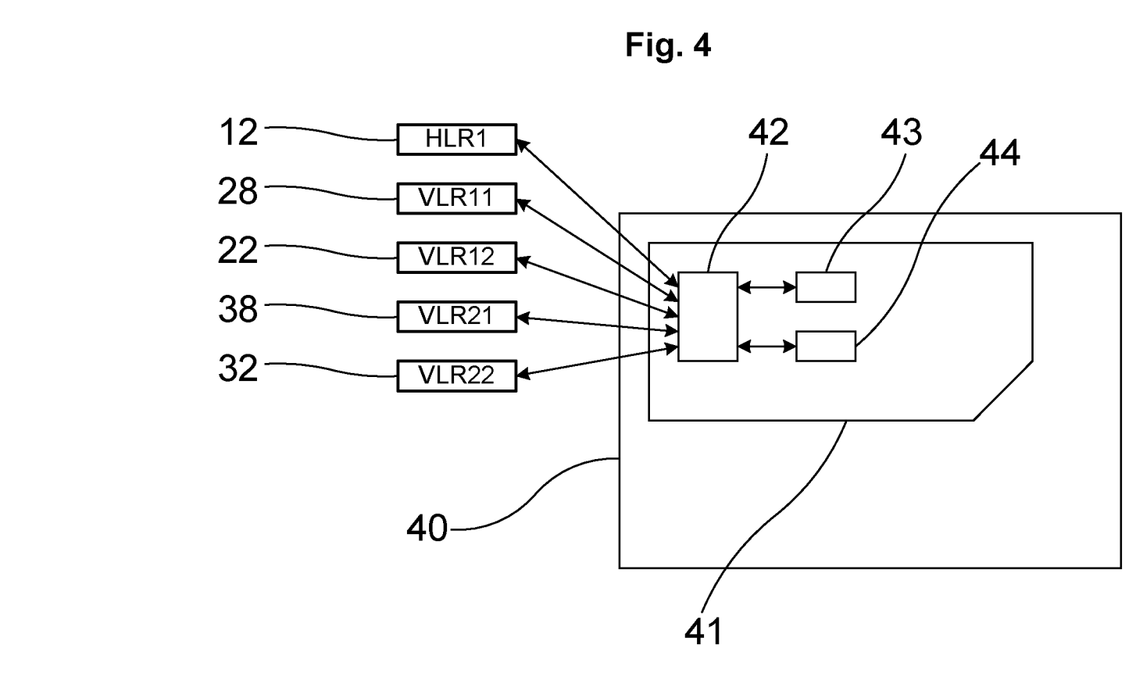
FIG. 4 is a simplified overview diagram of a mobile device having a SIM card according to the present invention.

FIG. 4 illustrates an exemplifying mobile device 40, comprising a SIM card 41 installed in the mobile device 40. FIG. 4 is heavily simplified, and does not, for example, show communication paths between the mobile phone 40 and the SIM card 41; the radio antenna of the mobile phone 40 via which all communication between the SIM card 41 and the external world takes place; etc., but is only intended to illustrate the principles of the present invention.

The SIM card 41 comprises a SIM card software application module 42, which is as described above, and which is connected to two IMSI memory places 43, 44. Naturally, there may be more than two IMSI memory places. An example of the function of the SIM card 41, including the software application 42, according to the present invention is the following.

First, a home IMSI is installed in the memory space 43 and used for network identification in the home network 10.

When the mobile device roams to the first visited network 26, an instruction message is sent from the HLR 12 and is received by the SIM card 41, whereupon the software application 42 replaces the home IMSI with the first visited country IMSI in the memory space 43 for use as network identification, as a local subscriber, in the first collaborating network 20, and the home IMSI is instead saved in the memory position 44 for later use. Then the software application 42 performs a device network refresh.

When the mobile phone thereafter roams from the first collaborating network 20 to the second visited network 36, the software application 42 detects this roaming event, since it monitors the country codes of the currently connected network. Hence, it shifts the home IMSI back to the memory position 43 for use as network identification. Then, it performs a device network refresh. This will result, via a location update message from VLR21 38 to HLR1 12, in that the SIM card 41 receives a message to again change the IMSI used for network identification to a second visited country IMSI. Upon receipt of this message, the software application 42 stores the second visited country IMSI in memory location 43 for use as network identification, and again saves the home IMSI in memory location 44. Thereafter the application 42 performs a device network refresh.

When the mobile phone roams back to the home network 10, the software application 42 again recognizes this, as a consequence of its country code monitoring, and as a result reinstalls the home IMSI in the memory position 43 for use as network identification. It then performs a device network refresh.

In practice, the message sent over the air from the HLR1 12 to the mobile device 40 to change the IMSI, may include instructions to write a new EF_IMSI, to delete the current IMSI from EF_LOCI, and then to perform a network refresh.

The software application 42 may, in practice, comprise the following logic for use when roaming into one country from another: If the last visited country was the home country 3, then save the current country as the last visited country and back up related information (LOCI, LOCIGPRS, PSLOCI, FPLMN, etc.) as the last used home info. If the last visited country, on the other hand, was not the home country 3, then save the current country as the last visited country and reset related information (IMSI, Ki, OPC, LOCI, LOCIGPRS, PSLOCI, FPLMN, etc.) to the last used home info and try to connect to an available network.

Above, preferred embodiments have been described. However, it is apparent to the skilled person that many modifications may be made to the described embodiments without departing from the basic thought of the invention.

For instance, as long as the signaling traffic is routed via the Internet 6 rather than via the conventional PSTN 1, the data traffic resulting from the Internet connection of the mobile device can be routed in any way, such as directly via an Internet tunnel and not using GRX 2.

The basic idea to route signaling traffic over the Internet according to the present invention is also useful even if not switching IMSI codes upon roaming into a visited network as described above.

Furthermore, the HLR2 18 may be connected to more than one home network 10, for example serving different subscribers in the home country 3.

Thus, the invention shall not be limited to the described embodiments, but may be varied within the scope of the enclosed claims.

The invention claimed is:

1. A method for use when a mobile communication device roams between a mobile communication home network in a home country and one or several mobile communication networks in one or several visited countries, which home network and networks in said visited countries are interconnected by a PSTN (Public Switched Telephone Network) operated by one or several PSTN operators, via which PSTN telephone signaling can be performed during roaming using a telephony signaling protocol, which mobile communication device comprises a Subscriber Identity Module (SIM) card identifying itself to each network using an International Mobile Subscriber Identity (IMSI), wherein the method comprises the steps of:
   a) storing on the SIM card a first visited country IMSI which is associated with a first collaborating mobile communication network in the first visited country, and using it for network identification of the SIM card;
   b) when the mobile device is located within the coverage area of the first collaborating network, causing the mobile device to initiate a location update procedure using the first visited country IMSI; wherein the method further comprises the subsequent steps of
   c) triggered by the said location update procedure and based on the first visited country IMSI used therein, causing the first collaborating network to investigate the contents of the said first IMSI, and, depending on the contents of said first IMSI, causing a first STP (Signal Transfer Point) of the first collaborating network to send a location update message to a first ITP (Internet Transfer Point) without using the PSTN;
   d) in case the location update message was sent to the first ITP, causing the first ITP to simply forward the location update message to a home ITP via the internet and not using the PSTN, and in turn causing the home ITP to forward the location update message to a home STP of the home network; and
   e) causing a subsequent signaling message addressed to the mobile device and using the first visited country IMSI to be sent by the home STP to the home ITP, which uses the first visited country IMSI to identify the first ITP and then forwards the subsequent message to the first ITP, over the internet and without using the PSTN, whereupon the first ITP forwards the subsequent message to the first STP for distribution to the mobile device.

2. The method according to claim 1, wherein, in an initial step, the SIM card is provided with a home IMSI associated with the home network, and wherein step a) comprises the substeps of
   a1) initiating a location update procedure after or in connection to the mobile device moving from the coverage area of the home network to the coverage area of a first visited network in the first visited country;
   a2) triggered by the location update message, sending an instruction message over the air to the mobile device to change, to the first visited country IMSI, the IMSI used for network identification of the SIM card; and
   a3) causing the mobile device to store the first visited country IMSI on the SIM card and to use it for network identification of the SIM card.

3. The method according to claim 1, wherein the method comprises the additional steps of
   f) causing the mobile device to store an APN (Access Point Name) identifying a GGSN (Gateway GPRS Support Node) in the home network; and
   g) upon a data connection attempt by the mobile device using the APN, setting up an Internet data connection to the mobile device via the GGSN and an SGSN (Serving GPRS Support Node) in the first collaborating network.

4. The method according to claim 1, wherein, upon roaming from the coverage area of the first collaborating network to the coverage area of a second visited network in a second visited country after step d) has been performed, the method comprises the additional steps of
   h) causing the mobile device to change the IMSI used for network identification of the SIM card back to the home IMSI and then to perform a device network refresh;
   i) triggered by a location update message resulting from the change of IMSI used for network identification and received by the home network, sending an instruction message over the air to the mobile device to change, to a second visited country IMSI which is associated with a second collaborating mobile communication network in the second visited country, the IMSI used for network identification of the SIM card; and
   j) resuming the method from step b), but with the second visited country, the second collaborating network, a second visited country IMSI and a second ITP instead of the first visited country, first collaborating network, first visited country IMSI and first ITP, respectively.

5. The method according to claim 1, wherein, in steps c) and d), the first visited country IMSI is not modified.

6. The method according to claim 1, wherein the first ITP is located in the first visited country, and wherein the home ITP is arranged in the home country.

7. The method according to claim 1, wherein a server comprising a HLR (Home Location Registry) is connected to, but arranged externally to, the home network, and wherein, in step d), the home network forwards the location update message to the HLR based upon the IMSI contained in the location update message.

8. The method according to claim 1, wherein all of the said IMSI codes except possibly the home IMSI are caused to be associated with a setting in the respective HLR with which the IMSI in question is associated making available data communication but not voice communication when roaming of the mobile device.

9. The method according to claim 8, wherein the data communication to and from the mobile device when being served by a collaborating network is in the form of Internet access, and is passed on to the home network using a roaming exchange or an Internet tunnel.

10. The method according to claim 1, wherein the first and/or second visited country IMSI codes are caused to belong to a respective plurality of IMSI codes, which plurality is associated with a respective visited country and caused to contain less individual IMSI codes than the total number of users of the method, and wherein all IMSI codes in said plurality are caused to be associated with a HLR of the respective collaborating network in the respective visited country.

11. The method according to claim 1, wherein the SIM card is caused to be provided with a software application arranged to monitor in which country the mobile device is currently located, arranged to perform the said changes of the IMSI used for network identification and arranged to perform the said device network refresh performances.

12. The method according to claim 11, wherein the software application is caused to monitor in which country the mobile device is currently located by reading the country codes present in available networks at the current location of the mobile device, and wherein a change of such country codes is interpreted as roaming of the mobile device.

13. A system for providing mobile communication signaling connection to a mobile communication device within the coverage area of a home network in a home country and one or several mobile communication networks in one or several visited countries, between which networks the mobile device can roam and which networks are interconnected by a PSTN (Public Switched Telephone Network) operated by one or several PSTN operators, via which PSTN telephone signaling can be performed during roaming using a telephony signaling protocol, which mobile communication device comprises a Subscriber Identity Module (SIM) card arranged to identify itself to a network using an International Mobile Subscriber Identity (IMSI), wherein the system comprises a first ITP (Internet Transfer Point) as well as functionality in a first collaborating mobile communication network in a first visited country, which functionality is arranged to investigate the contents in a first IMSI, which first IMSI is used in a location update procedure initiated by the mobile device when it is present within the coverage area of the first collaborating network, and, based upon the said first IMSI which is used therein and depending on the contents in the said first IMSI, to cause an STP (Signal Transfer Point) in the first collaborating network to send a first location update message, comprising the first IMSI, to the first ITP, without using the PSTN, wherein the system further comprises a home ITP, wherein the first ITP is arranged to receive the said first location update message from the STP, and wherein the first ITP is further arranged to simply forward the first location update message, via the internet and not using the PSTN, to the home ITP, and the home ITP in turn being arranged to forward the location update message to a home STP of the home network, wherein the home ITP is arranged to receive a subsequent signaling message, addressed to the mobile device and using the said first IMSI, from the home STP, and to use the said first IMSI to identify the first ITP and then to forward the subsequent message to the first ITP, over the internet and without using the PSTN, whereupon the first ITP is arranged to forward the subsequent message to the first STP for distribution to the mobile device.

14. The system according to claim 13, wherein the system further comprises a second ITP, arranged to receive a second location update message comprising a second visited country IMSI, associated with a second collaborating network, from an STP of the second collaborating network, wherein the second ITP is further arranged to forward the location update message to the STP of the home network via the internet and not using the PSTN, and wherein the home ITP is also arranged to route signaling messages comprising an IMSI from the home STP to either of the first and second ITPs based upon the IMSI comprised in each signaling message.

15. The system according to claim 13, wherein the system further comprises a HLR (Home Location Register), arranged to communicate with the home STP and comprising or being associated with a set of IMSI codes which are associated with the first collaborating network.

\* \* \* \* \*